(12) United States Patent
Walker et al.

(10) Patent No.: US 8,028,739 B2
(45) Date of Patent: Oct. 4, 2011

(54) INSERTS WITH HOLES FOR DAMPED PRODUCTS AND METHODS OF MAKING AND USING THE SAME

(75) Inventors: Michael J. Walker, Windsor (CA); Michael D. Hanna, West Bloomfield, MI (US); James G. Schroth, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 939 days.

(21) Appl. No.: 11/926,798

(22) Filed: Oct. 29, 2007

(65) Prior Publication Data

US 2009/0107787 A1 Apr. 30, 2009

(51) Int. Cl.
*B22D 19/00* (2006.01)

(52) U.S. Cl. ............... 164/98; 164/100; 164/112

(58) Field of Classification Search ............ 164/98, 164/100, 112
See application file for complete search history.

(56) References Cited

U.S. PATENT DOCUMENTS

| 974,024 A | 10/1910 | Carter |
|---|---|---|
| 1,484,421 A | 2/1924 | Thomspon |
| 1,989,211 A | 1/1935 | Norton |
| 2,012,838 A | 8/1935 | Tilden |
| 2,026,878 A | 1/1936 | Farr |
| 2,288,438 A | 6/1942 | Dach |
| 2,603,316 A | 7/1952 | Pierce |
| 2,978,793 A | 4/1961 | Lamson et al. |
| 3,085,391 A | 4/1963 | Hatfield et al. |
| 3,127,959 A | 4/1964 | Wengrowski |
| 3,147,828 A | 9/1964 | Hunsaker |
| 3,292,746 A | 12/1966 | Robinette |
| 3,378,115 A | 4/1968 | Stephens, III |
| 3,425,523 A | 2/1969 | Robinette |
| 3,509,973 A | 5/1970 | Kimata |
| 3,575,270 A | 4/1971 | Reinbek et al. |
| 3,774,472 A | 11/1973 | Mitchell |
| 3,841,448 A | 10/1974 | Norton, Jr. |
| 3,975,894 A | 8/1976 | Suzuki |
| 4,049,085 A | 9/1977 | Blunier |
| 4,072,219 A | 2/1978 | Hahm et al. |
| 4,195,713 A | 4/1980 | Hagbjer et al. |
| 4,250,950 A | 2/1981 | Buxmann et al. |
| 4,278,153 A | 7/1981 | Venkatu |
| 4,338,758 A | 7/1982 | Hagbjer |
| 4,379,501 A | 4/1983 | Hagiwara et al. |

(Continued)

FOREIGN PATENT DOCUMENTS

AL 19649919 A1 6/1998

(Continued)

OTHER PUBLICATIONS

Dessouki et al., U.S. Appl. No. 10/961,813, Coulumb friction damped disc brake rotors, filed Oct. 8, 2004.

(Continued)

*Primary Examiner* — Kevin P Kerns
(74) *Attorney, Agent, or Firm* — Reising Ethington P.C.

(57) ABSTRACT

One embodiment of the invention includes a frictional damping insert including a body constructed and arranged to be incorporated into a product and to form at least a portion of a frictional damping structure, the body including lines of weakness constructed and arranged to segment the body into separate sections upon exposure to a molten material.

8 Claims, 8 Drawing Sheets

U.S. PATENT DOCUMENTS

| | | | |
|---|---|---|---|
| 4,475,634 A | 10/1984 | Flaim et al. | |
| 4,523,666 A | 6/1985 | Murray | |
| 4,529,079 A | 7/1985 | Albertson | |
| 4,905,299 A | 2/1990 | Ferraiuolo et al. | |
| 5,004,078 A * | 4/1991 | Oono et al. | 188/218 A |
| 5,025,547 A | 6/1991 | Sheu et al. | |
| 5,083,643 A | 1/1992 | Hummel et al. | |
| 5,115,891 A | 5/1992 | Raitzer et al. | |
| 5,139,117 A | 8/1992 | Melinat | |
| 5,143,184 A | 9/1992 | Snyder et al. | |
| 5,183,632 A | 2/1993 | Kluchi et al. | |
| 5,184,662 A | 2/1993 | Quick et al. | |
| 5,259,486 A | 11/1993 | Deane | |
| 5,310,025 A | 5/1994 | Anderson | |
| 5,416,962 A | 5/1995 | Passarella | |
| 5,417,313 A | 5/1995 | Matsuzaki et al. | |
| 5,509,510 A | 4/1996 | Ihm | |
| 5,530,213 A | 6/1996 | Hartsock et al. | |
| 5,582,231 A | 12/1996 | Siak et al. | |
| 5,620,042 A * | 4/1997 | Ihm | 164/95 |
| 5,660,251 A | 8/1997 | Nishizawa et al. | |
| 5,789,066 A | 8/1998 | DeMare et al. | |
| 5,819,882 A | 10/1998 | Reynolds et al. | |
| 5,855,257 A | 1/1999 | Wickert et al. | |
| 5,862,892 A | 1/1999 | Conley | |
| 5,878,843 A | 3/1999 | Saum | |
| 5,927,447 A | 7/1999 | Dickerson | |
| 5,965,249 A | 10/1999 | Sutton et al. | |
| 6,047,794 A | 4/2000 | Nishizawa | |
| 6,073,735 A | 6/2000 | Botsch et al. | |
| 6,112,865 A | 9/2000 | Wickert et al. | |
| 6,206,150 B1 | 3/2001 | Hill | |
| 6,216,827 B1 | 4/2001 | Ichiba et al. | |
| 6,223,866 B1 | 5/2001 | Giacomazza | |
| 6,231,456 B1 | 5/2001 | Rennie et al. | |
| 6,241,055 B1 | 6/2001 | Daudi | |
| 6,241,056 B1 | 6/2001 | Cullen et al. | |
| 6,283,258 B1 | 9/2001 | Chen et al. | |
| 6,302,246 B1 | 10/2001 | Naumann et al. | |
| 6,357,557 B1 | 3/2002 | DiPonio | |
| 6,405,839 B1 | 6/2002 | Ballinger et al. | |
| 6,465,110 B1 | 10/2002 | Boss et al. | |
| 6,481,545 B1 | 11/2002 | Yano et al. | |
| 6,505,716 B1 | 1/2003 | Daudi et al. | |
| 6,507,716 B2 | 1/2003 | Nomura et al. | |
| 6,543,518 B1 | 4/2003 | Bend et al. | |
| 6,648,055 B1 | 11/2003 | Haug et al. | |
| 6,799,664 B1 | 10/2004 | Connolly | |
| 6,880,681 B2 | 4/2005 | Koizumi et al. | |
| 6,890,218 B2 | 5/2005 | Patwardhan et al. | |
| 6,899,158 B2 | 5/2005 | Matuura et al. | |
| 6,932,917 B2 | 8/2005 | Golden et al. | |
| 6,945,309 B2 | 9/2005 | Frait et al. | |
| 7,066,235 B2 | 6/2006 | Huang | |
| 7,112,749 B2 | 9/2006 | DiPaola et al. | |
| 7,178,795 B2 | 2/2007 | Huprikar et al. | |
| 7,293,755 B2 | 11/2007 | Miyahara et al. | |
| 7,594,568 B2 | 9/2009 | Hanna et al. | |
| 7,604,098 B2 | 10/2009 | Dessouki et al. | |
| 7,644,750 B2 | 1/2010 | Schroth et al. | |
| 7,775,332 B2 * | 8/2010 | Hanna et al. | 188/218 XL |
| 7,836,938 B2 * | 11/2010 | Agarwal et al. | 164/100 |
| 2002/0084156 A1 | 7/2002 | Ballinger et al. | |
| 2002/0104721 A1 | 8/2002 | Schaus et al. | |
| 2003/0037999 A1 | 2/2003 | Tanaka et al. | |
| 2003/0127297 A1 | 7/2003 | Smith et al. | |
| 2003/0141154 A1 | 7/2003 | Rancourt et al. | |
| 2003/0213658 A1 | 11/2003 | Baba | |
| 2004/0031581 A1 | 2/2004 | Herreid et al. | |
| 2004/0045692 A1 | 3/2004 | Redemske | |
| 2004/0074712 A1 | 4/2004 | Quaglia et al. | |
| 2004/0084260 A1 | 5/2004 | Hoyte et al. | |
| 2004/0242363 A1 | 12/2004 | Kohno et al. | |
| 2005/0011628 A1 | 1/2005 | Frait et al. | |
| 2005/0150222 A1 | 7/2005 | Kalish et al. | |
| 2005/0183909 A1 | 8/2005 | Rau, III et al. | |
| 2005/0193976 A1 | 9/2005 | Suzuki et al. | |
| 2006/0076200 A1 | 4/2006 | Dessouki et al. | |
| 2006/0243547 A1 | 11/2006 | Keller | |
| 2007/0039710 A1 | 2/2007 | Newcomb | |
| 2007/0056815 A1 | 3/2007 | Hanna et al. | |
| 2007/0062664 A1 | 3/2007 | Schroth et al. | |
| 2007/0062768 A1 * | 3/2007 | Hanna et al. | 188/218 XL |
| 2007/0142149 A1 | 6/2007 | Kleber | |
| 2007/0166425 A1 | 7/2007 | Utsugi | |
| 2007/0235270 A1 | 10/2007 | Miskinis et al. | |
| 2007/0298275 A1 | 12/2007 | Carter et al. | |
| 2008/0099289 A1 | 5/2008 | Hanna et al. | |
| 2008/0185249 A1 * | 8/2008 | Schroth et al. | 188/381 |
| 2009/0032569 A1 | 2/2009 | Sachdev et al. | |
| 2009/0107787 A1 | 4/2009 | Walker et al. | |

FOREIGN PATENT DOCUMENTS

| | | |
|---|---|---|
| CH | 428319 A | 1/1967 |
| CN | 20051113784 A | 10/2005 |
| CN | 1757948 A | 4/2006 |
| CN | 2863313 Y | 1/2007 |
| DE | 2446938 A1 | 4/1976 |
| DE | 2537038 A1 | 3/1977 |
| DE | 19948009 C1 | 3/2001 |
| DE | 60000008 T2 | 3/2002 |
| DE | 10141698 A1 | 3/2003 |
| DE | 102005048258 A1 | 4/2006 |
| DE | 60116780 T2 | 11/2006 |
| EP | 0205713 A1 | 12/1986 |
| GB | 1230274 | 4/1971 |
| JP | 57154533 A | 9/1982 |
| JP | 1126434 U1 | 8/1989 |
| JP | 05-104567 | 4/1993 |
| JP | 11342461 A | 12/1999 |
| JP | 2003214465 A | 7/2003 |
| JP | 2004011841 A | 1/2004 |
| KR | 20010049837 A | 6/2001 |
| WO | 9823877 A1 | 6/1998 |
| WO | 0136836 A1 | 5/2001 |
| WO | 2007035206 A2 | 3/2007 |

OTHER PUBLICATIONS

Hanna et al., U.S. Appl. No. 11/475,756, Bi-metal disc brake rotor and method of manufacturing, filed Jun. 27, 2006.

Schroth et al., U.S. Appl. No. 11/475,759, Method of casting components with inserts for noise reduction, filed Jun. 27, 2006.

Schroth et al., U.S. Appl. No. 12/025,967, Damped products and methods of making and using the same, filed Feb. 5, 2008.

Hanna et al., U.S. Appl. No. 11/440,916, Bi-metal disc brake rotor and method of manufacture, filed May 25, 2006.

Hanna et al., U.S. Appl. No. 11/554,234, Coulomb damped disc brake rotor and method of manufacturing, filed Oct. 30, 2006.

Hanna et al., U.S. Appl. No. 11/832,401, Damped product with insert and method of making the same, filed Aug. 1, 2007.

Kleber, et al., U.S. Appl. No. 11/848,732, Cast-in-place torsion joint, filed Aug. 31, 2007.

Hanna et al., U.S. Appl. No. 11/780,679, Method of manufacturing a damped part, filed Jul. 20, 2007.

Aase et al., U.S. Appl. No. 11/969,259, Method of forming casting with frictional damping insert, filed Jan. 4, 2008.

Hanna et al., U.S. Appl. No. 12/165,729, Method for securing an insert in the manufacture of a damped part, filed Jul. 1, 2008.

Hanna et al., U.S. Appl. No. 12/165,731, Product with metallic foam and method of manufacturing the same, filed Jul. 1, 2008.

Agarwal et al., U.S. Appl. No. 11/860,049, Insert with tabs and damped products and methods of making the same, filed Sep. 24, 2007.

Hanna et al., U.S. Appl. No. 12/174,163, Damped part, filed Jul. 16, 2008.

Hanna et al., U.S. Appl. No. 12/174,223, Method of casting damped part with insert, filed Jul. 16, 2008.

Hanna et al., U.S. Appl. No. 12/183,180, Casting noise-damped, vented brake rotors with embedded inserts, filed Jul. 31, 2008.

Hanna et al., U.S. Appl. No. 12/183,104, Low mass multi-piece sound damped article, filed Jul. 31, 2008.

Golden et al., U.S. Appl. No. 12/105,411, Insert with filler to dampen vibrating components, filed Apr. 18, 2008.

Hanna et al., U.S. Appl. No. 11/440,893, Rotor assembly and method, filed May 25, 2006.
Carter, U.S. Appl. No. 11/680,179, Damped automotive components with cast in place inserts and method of making same, filed Feb. 28, 2007.
Ulicny et al., U.S. Appl. No. 12/105,438, Filler material to dampen vibrating components, filed Apr. 18, 2008.
Hanna et al., U.S. Appl. No. 12/272,164, Surface configurations for damping inserts, filed Nov. 17, 2008.
Hanna et al., U.S. Appl. No. 12/145,169, Damped product with an insert having a layer including graphite thereon and methods of making and using the same, filed Jun. 24, 2008.
Lowe et al., U.S. Appl. No. 12/174,320, Damped part with insert, filed Jul. 16, 2008.
Xia, U.S. Appl. No. 11/858,596, Lightweight brake rotor and components with composite materials, filed Sep. 20, 2007.
Dessouki et al., U.S. Appl. No. 12/178,872, Friction damped brake drum, filed Jul. 24, 2008.
Sachdev et al., U.S. Appl. No. 11/832,356, Friction welding method and products made using the same, filed Aug. 1, 2007.
Chinese First Office Action; CN200510113784.X; Dated May 18, 2007; 19 pages.
Chinese Second Office Action; CN200510113784.X; Dated Feb. 15, 2008; 13 pages.
German Examination Report; DE102005048258.9-12; Dated Oct. 22, 2007; 8 pages.
Gerdemann, Steven J,; TITANIUM Process Technologies; Advanced Materials & Processes, Jul. 2001, pp. 41-43.
Mahoney, M. W. & Lynch S. P.; Friction-Stir Processing; 15 pages.
MPIF: All You Need to Know about Powder Metallurgy; http://www.mpif.org/IntroPM/intropm/asp?linkid=1; 8 pages print date Jun. 23, 2008.
Powder Metallurgy—Wikipedia article; http://en.wikipedia.org/wiki/Powder_metallurgy; 5 pages print date Jun. 19, 2008.
Sintering—Wikipedia article; http://en.wikipedia.org/wiki/Sintering; 2 pages print date Jun. 19, 2008.
Magnetorheological fluid—Wikipedia article; http:en/wikipedia.org/wiki/Magnetorheological_fluid print date Nov. 6, 2007.
PCT/US2008/087354 Written Opinion and Search Report; Date of Mailing: Aug. 3, 2009; 9 pages.
PCT/US2009/039839 Written Opinion and Search Report; Date of Mailing: Nov. 24, 2009; 7 pages.
PCT/US2009/048424 Written Opinion and Search Report; Date of Mailing; Dec. 28, 2009; 7 pages.
U.S. Appl. No. 12/328,989; Filing Date: Dec. 5, 2008; First Named Inventor: Patrick J. Monsere.
U.S. Appl. No. 12/420,259; Filing Date: Apr. 8, 2009; First Named Inventor: Michael D. Hanna.
U.S. Appl. No. 12/434,057; Filing Date: May 1, 2009; First Named Inventor: Chongmin Kim.
U.S. Appl. No. 12/436,830; Filing Date: May 7, 2009; First Named Inventor: James G. Schroth.
U.S. Appl. No. 12/489,901; Filing Date: Jun. 23, 2009; First Named Inventor: Michael D. Hanna.
U.S. Appl. No. 12/885,813; Filing Date Sep. 20, 2010; First Named Inventor: Michael D. Hanna.

* cited by examiner

US 8,028,739 B2

INSERTS WITH HOLES FOR DAMPED PRODUCTS AND METHODS OF MAKING AND USING THE SAME

TECHNICAL FIELD

The field to which the disclosure generally relates includes damped products, components thereof and methods of making and using the same.

BACKGROUND

Parts subjected to vibration may produce unwanted or undesirable vibrations. Similarly, a part or component may be set into motion at an undesirable frequency and/or amplitude and for a prolonged period. For example, parts such as brake rotors, brackets, pulleys, brake drums, transmission housings, gears, and other parts may contribute to noise that gets transmitted to the passenger compartment of a vehicle. In an effort to reduce the generation of this noise and thereby its transmission into the passenger compartment, a variety of techniques have been employed, including the use of polymer coatings on engine parts, sound absorbing barriers, and laminated panels having viscoelastic layers. The undesirable vibrations in parts or components may occur in a variety of other products including, but not limited to, sporting equipment, household appliances, manufacturing equipment such as lathes, milling/grinding/drilling machines, earth moving equipment, other nonautomotive applications, and components that are subject to dynamic loads and vibration. These components can be manufactured through a variety of means including casting, machining, forging, die-casting, etc.

SUMMARY OF EXEMPLARY EMBODIMENTS OF THE INVENTION

One embodiment of the invention includes a frictional damping insert including a body constructed and arranged to be incorporated into a product and to form at least a portion of a frictional damping means, the body including lines of weakness constructed and arranged to segment the body into separate sections upon exposure to a molten material.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
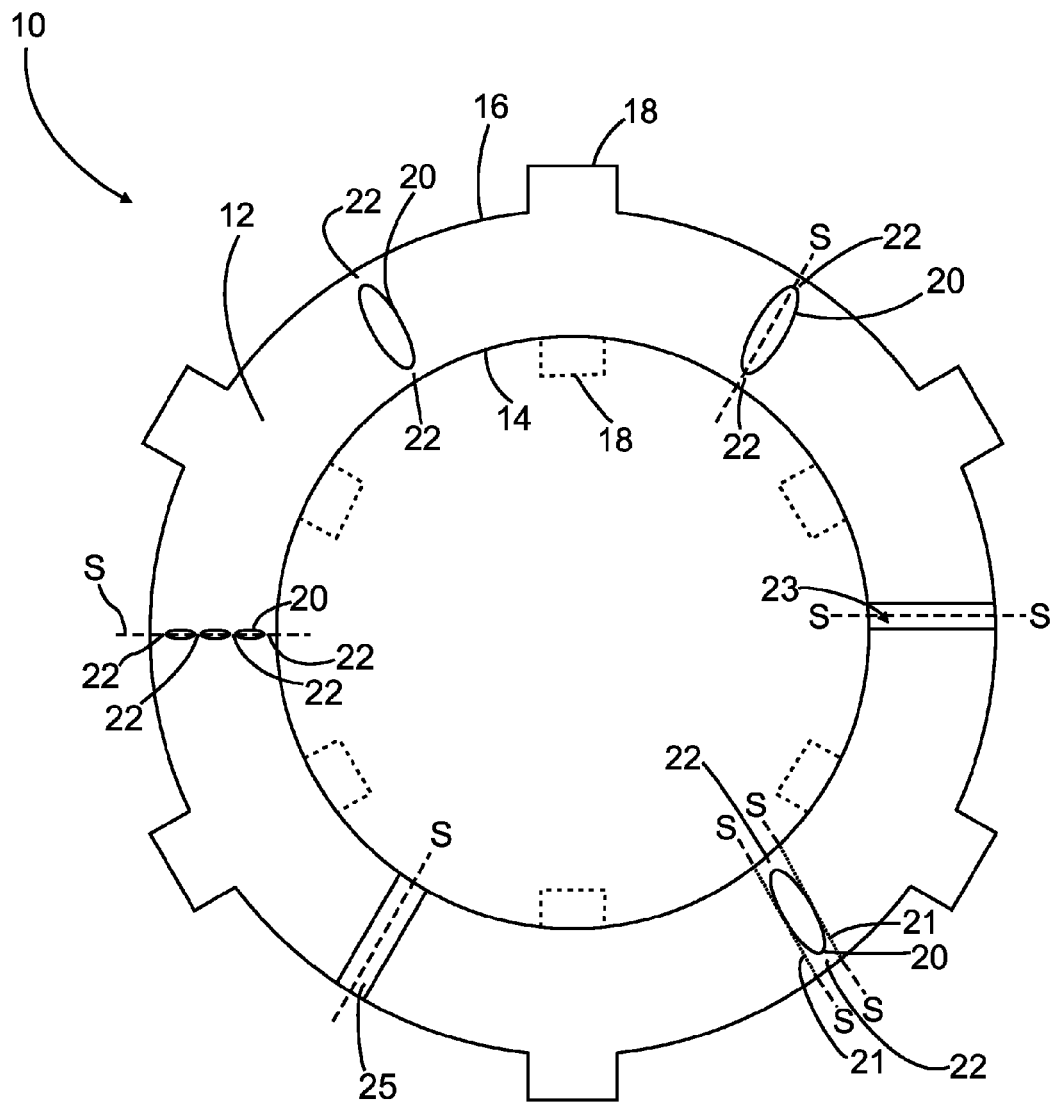
FIG. 1 illustrates the insert with alternative configurations shown in phantom, according to one embodiment of the invention.
Figure 2:
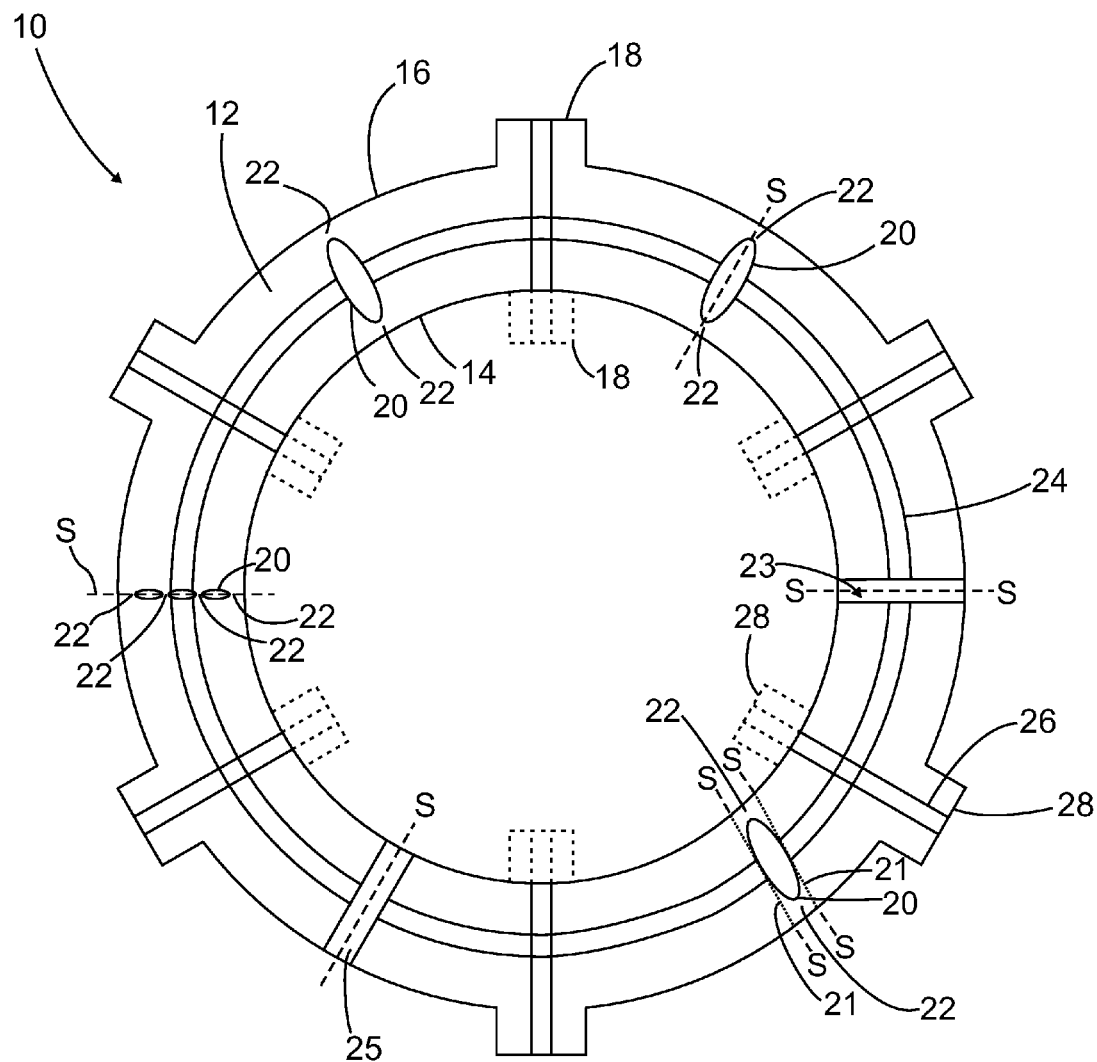
FIG. 2 illustrates the insert with alternative configurations shown in phantom, according to one embodiment of the invention.

Referring to FIGS. 1-2, an insert 10 is provided according to one embodiment of the invention. The insert 10 may provide damping in a product or part 500. In various embodiments, the insert 10 may have various geometric configurations. In one embodiment, the insert 10 may have an annular body 12 comprising an inner edge 14 (at an inner diameter of the annular body 12) and an outer edge 16 (at an outer diameter of the annular body 12). The insert may include a plurality of tabs 18, which may extend from at least one of the inner edge 14 or the outer edge 16 of the annular body 12. In FIGS. 1-2, the tabs 18 extending from the inner edge 14 are shown in phantom. The annular body 12 may include a plurality of slots 20. The slots 20 may be of any shape, for example, an oval, circle, square, rectangle, or triangle. In one embodiment, the slots 20 may be thin blind slots that do not pass through or extend through the entire insert 10. The annular body 12 may also include a plurality of connector regions 22, which include the portion of the annular body between each slot 20 and the outer edge 16, and between each slot 20 and the inner edge 14.

During the process of manufacturing a product or part 500 containing the insert 10, the tabs 18 allow the insert 10 to be placed securely in the mold. The insert 10 has sufficient rigidity to be loaded into the mold as one piece. But during the process of manufacturing the product or part 500, in one embodiment at least one of the plurality of connector regions 22 or the thin blind slots 20 may be constructed and arranged to melt or dissolve. In this way, the insert 10 becomes segmented or severed during the casting process, and each segment is supported and prevented from moving too much by the tabs 18. Thus, the slots 20 may prevent gross distortion of the insert 10 during the casting process. The insert 10 may be able to expand thermally without moving in the axial direction.

To facilitate the melting or dissolving of the plurality of the connector regions 22, the plurality of connector regions 22 may be thinner than the remainder of the annular body 12. In one embodiment, the connector regions 22 may be about 0.2 to about 10 mm thick. The connector regions 22 may be composed of the same material as the remainder of the annular body 12, for example, titanium, steel, stainless steel, cast iron, aluminum, magnesium, zinc, any of a variety of other alloys, or metal matrix composite.

In another embodiment, the connector regions 22 may be composed of a different material than the remainder of the annular body 12, for example a low melting point material. A low melting point material has a melting point lower than the melting point of the remainder of the insert 10. In one embodiment, the low melting point material melts at a temperature less than 2400° F. In one embodiment, the low melting point material may be, for example, adhesives, plastics, STYROFOAM, brazed joint, or low melting point metals.

In one embodiment, the insert 10 may have a coating over all of the insert 10 or at least a portion thereof. In another embodiment, the annular body 12 may have a coating, but the tabs 18 may not have the coating. In another embodiment, the annular body 12 and tabs 18 may have a coating but the connectors 22 may not have a coating to facilitate the melting of the connectors 22. In another embodiment, the annular body 12 and tabs 18 may have a coating but the thin blind slots 20 may not have a coating to facilitate the melting of the thin blind slots 20. The coating may prevent molten metal from wetting the coated portion of the insert 10 and/or to provide at least a portion of a frictional damping means as described hereafter.

As shown in FIG. 2, according to one embodiment of the invention, the insert 10 may include an annular stiffening rib 24 in the annular body 12. The annular stiffening rib 24 may be approximately equidistant from the inner edge 14 and the outer edge 16. In another embodiment, the insert 10 may include a plurality of radial stiffening ribs 26, which may extend from the inner edge 14 of the annular body 12 to the outer edge 28 of the tabs 18. The plurality of radial stiffening ribs 26 on the tabs 18 extending from the inner edge 14 of the annular body 12 are shown in phantom in FIG. 2.

As will be appreciated from FIGS. 1-2, one embodiment of the invention may include an insert 10 having at least two lines of weakness generally shown by line S, constructed and arranged to allow the insert to be segmented when the line of weakness S is exposed to molten material such as molten metal and melts or dissolves. In one embodiment, the line of weakness S may include the single slot 20 and the adjacent connector regions 22. In another embodiment the line of weakness S may include a plurality of slots 20 or perforations positioned generally in a line with connector regions 22 adjacent to each slot 20. In another embodiment, the line of weakness S may be a region of the body portion which has been machined or otherwise formed to provide a section 25 of the body portion 12 which is thinner than adjacent sections of the body portion 12 and which melts when exposed to molten metal. In another embodiment of the invention the line of weakness S may include a scored section 21 of the body portion 12. The scored section 21 may be located along one or more sides of the connector regions 22.

In another embodiment of the invention the line of weakness S may include another material 23 which may be used to temporarily hold separate sections of the body portion 12 together so that the insert may be placed into the mold in one piece. The other material 23 may have a lower melting point than the body portion 12. Examples of a suitable other material 23 may include, but are not limited to, adhesives, plastics, STYROFOAM, brazed joint, or low melting point metals. In another embodiment of the invention the connector regions 22 serve as wettable portions temporarily connecting together sections of the body portion 12.

Figure 3:
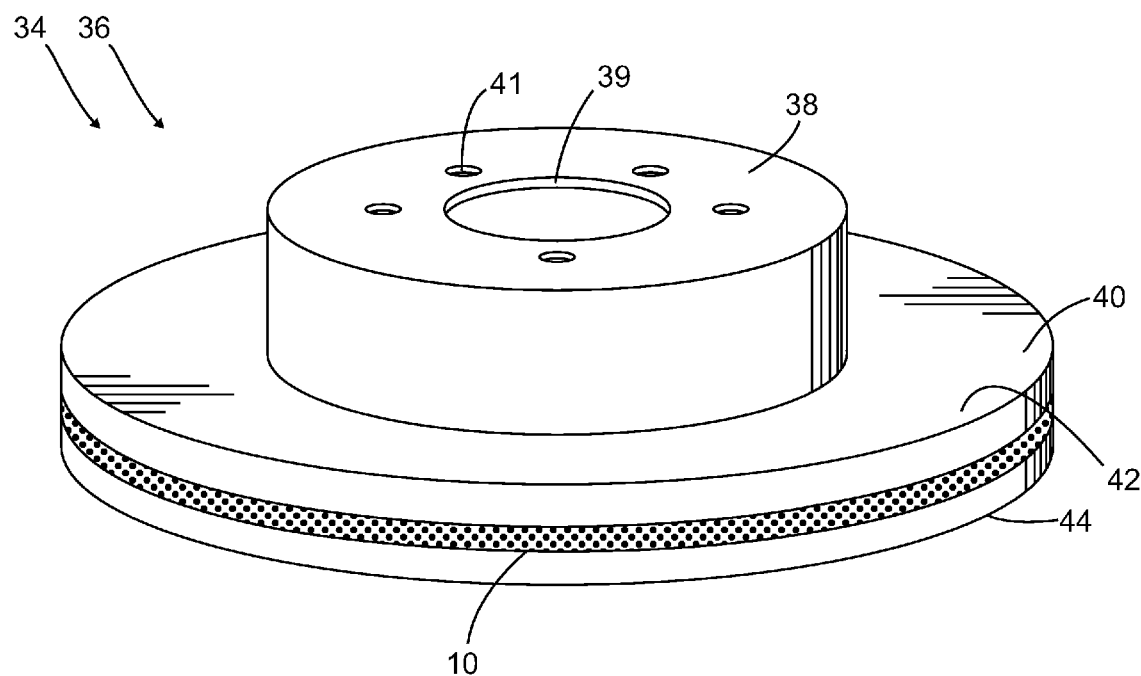
FIG. 3 is a schematic view of a rotor assembly according to one embodiment of the invention.

The insert 10 may be located in the product or part 500 as shown in FIG. 3. The part 500 may be, for example, a rotor assembly 36. The rotor assembly 36 may include a hub portion 38, an annular portion 40, and the insert 10. The annular portion 40 may include a first face 42 and an opposite second face 44. In one embodiment, the hub portion 38 may include a central aperture 39. The hub portion 38 may also include a plurality of bolt holes 41. In another embodiment, the rotor assembly 36 may be vented and may include a first rotor cheek including the first face 42 and a second rotor cheek including the second face 44. The first rotor cheek including the first face 42 and the second rotor cheek including the second face 44 may be separated by a plurality of vanes (not shown).

Figure 4A:
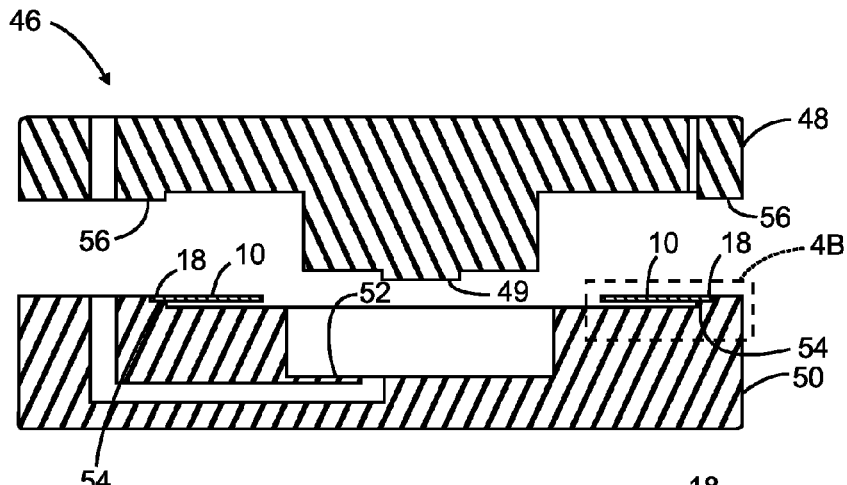
FIG. 4A is a schematic side sectional view of an insert positioned within a casting mold, according to one embodiment of the invention.

According to one embodiment of the invention, a method is provided for manufacturing a damped part. As shown in FIG. 4A, a mold 46 is provided with an first mold portion 48 and a second mold portion 50. The first mold portion 48 and the second mold portion 50 are configured to manufacture the part 34. Vertical, horizontal or any other molding orientation may be used. The two portions 48, 50 of the mold form a cavity 52 for casting the part 34. The first mold portion 48 and the second mold portion 50 may be sand molds. The first mold portion 48 may also include a generally cylindrical protrusion 49 configured to produce the central aperture 39 (shown in FIG. 3). But in other embodiments, the central aperture 39 may be produced by a subsequent machining process. In one embodiment, the plurality of bolt holes 41 (shown in FIG. 3) may be produced by a plurality of smaller protrusions (not shown) in the first mold portion 48 or by a subsequent machining process.

Figure 4B:
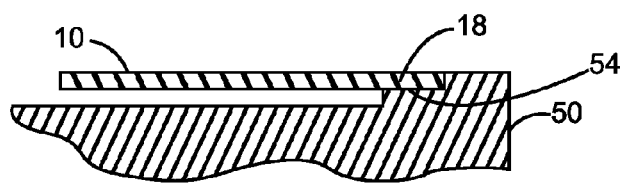
FIG. 4B is an enlarged view of the area 4B identified in FIG. 4A, according to one embodiment of the invention.

Referring to FIG. 4A, the insert 10 (with or without the coating) is positioned within the second mold portion 50. The insert 10 may have tabs 18 which may rest on cutout portions 54 of the second mold portion 50. FIG. 4B is an enlarged view of the portion 4B outlined in FIG. 4A, showing the insert 10 positioned within the second mold portion 50.

Figure 4C:
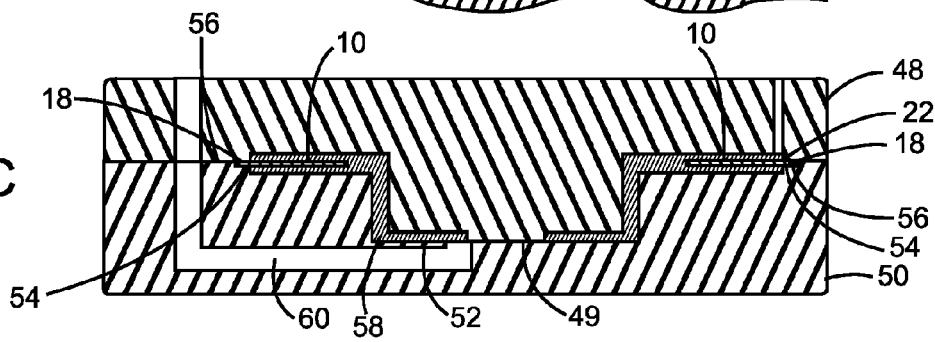
FIG. 4C is a schematic side sectional view of the mold and insert of FIG. 4A with the mold closed and material introduced into the mold, according to one embodiment of the invention.

As shown in FIG. 4C, the mold portions 48 and 50 are then closed together. A compressive force may be applied to the mold portions 48 and 50. The tabs 18 of the insert 10 may be supported between the cutout portions 54 of the second mold portion 50 and the lands 56 of the first mold portion 48. According to one embodiment, a material 58 is then introduced, for example injected, into the cavity 52 through a channel 60 to form the part 34. The material 58 may be a molten substance, for example molten cast iron, gray cast iron, steel, aluminum, titanium, metal matrix composites, or magnesium. In another embodiment, the material 58 is a semi-solid material and may be introduced into the cavity 52 in accordance with the well known semi-solid forging process.

Figure 4D:
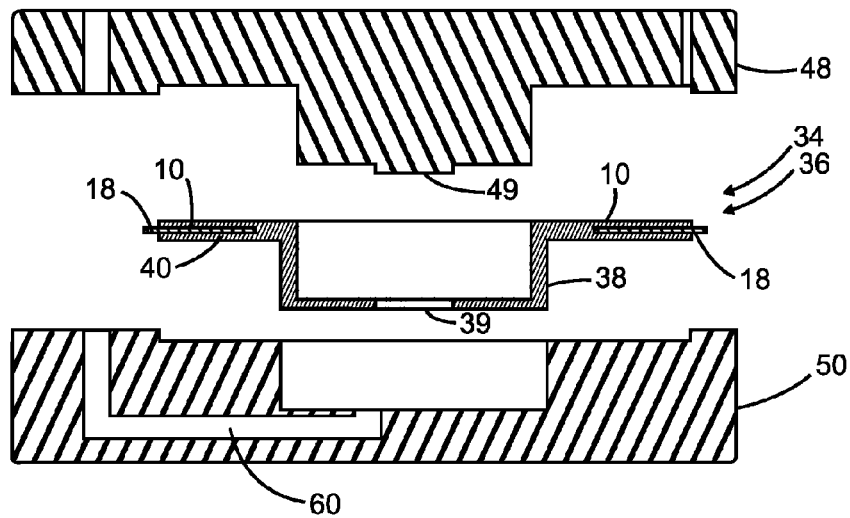
FIG. 4D is a schematic side sectional view of the mold of FIG. 4A, with the mold opened and a product ejected from the mold, according to one embodiment of the invention.
Figure 5:
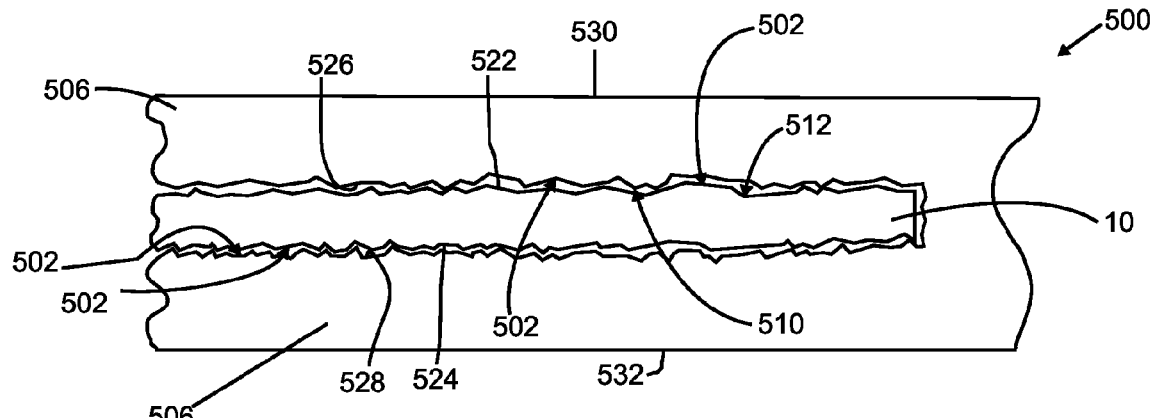
FIG. 5 is a sectional view with portions broken away of one embodiment of the invention including an insert.

Referring to FIG. 4D, after the material 58 has cooled, the mold 46 may be opened and the finished part 34 may be removed from the mold 46. In one embodiment, the part 34 is a rotor assembly 36 and includes the hub portion 38, the annular portion 40, and the insert 10. When the mold portions 48 and 50 are returned to the open position, the next insert 10 may be positioned into the open mold and the manufacturing process of the part 34 may repeat.

Referring to FIGS. 5-18, one embodiment of the invention includes a product or part 500 having a frictional damping means. The frictional damping means may be used in a variety of applications including, but not limited to, applications where it is desirable to reduce noise associated with a vibrating part or reduce the vibration amplitude and/or duration of a part that is struck, dynamically loaded, excited, or set in motion. In one embodiment the frictional damping means may include an interface boundary conducive to frictionally damping a vibrating part. In one embodiment the damping means may include frictional surfaces 502 constructed and arranged to move relative to each other and in frictional contact, so that vibration of the part is dissipated by frictional damping due to the frictional movement of the surfaces 502 against each other.

According to various illustrative embodiments of the invention, frictional damping may be achieved by the movement of the frictional surfaces 502 against each other. The movement of frictional surfaces 502 against each other may include the movement of: surfaces of the body 506 of the part against each other; a surface of the body 506 of the part against a surface of the insert 10; a surface of the body 506 of the part against the layer 520; a surface of the insert 10 against the layer 520; a surface of the body 506 of the part against the particles 514 or fibers; a surface of the insert 10 against the particles 514 or fibers; or by frictional movement of the particles 514 or fibers against each other or against remaining binder material.

In embodiments wherein the frictional surface 502 is provided as a surface of the body 506 or the insert 10 or a layer 520 over one of the same, the frictional surface 502 may have a minimal area over which frictional contact may occur that may extend in a first direction a minimum distance of 0.1 mm and/or may extend in a second (generally traverse) direction a minimum distance of 0.1 mm. In one embodiment the insert 10 may be an annular body and the area of frictional contact on a frictional surface 502 may extend in an annular direction a distance ranging from about 20 mm to about 1000 mm and in a transverse direction ranging from about 10 mm to about 75 mm. The frictional surface 502 may be provided in a variety of embodiments, for example, as illustrated in FIGS. 5-18.

Referring again to FIG. 5, in another embodiment of the invention one or more of the outer surfaces 522, 524 of the insert 10 or surfaces 526, 528 of the body 506 of the part 500 may include a relatively rough surface including a plurality of peaks 510 and valleys 512 to enhance the frictional damping of the part. In one embodiment, the surface of the insert 10 or the body 506 may be abraded by sandblasting, glass bead blasting, water jet blasting, chemical etching, machining or the like.

Each frictional surface 502 may have a plurality of peaks 510 and a plurality of valleys 512. The depth as indicated by line V of the valleys 512 may vary with embodiments. In various embodiments, the average of the depth V of the valleys 512 may range from about 1 µm-300 µm, 50 µm-260 µm, 100 µm-160 µm or variations of these ranges. However, for all cases there is local contact between the opposing frictional surfaces 502 during component operation for frictional damping to occur.

Figure 7:
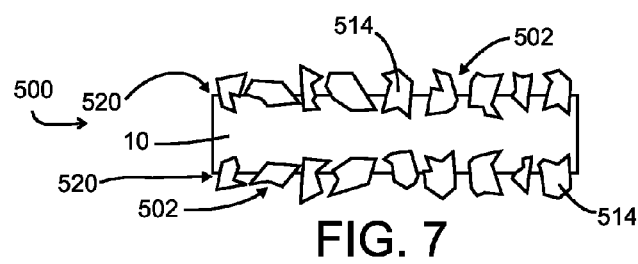
FIG. 7 is an enlarged view of one embodiment of the invention.
Figure 8:
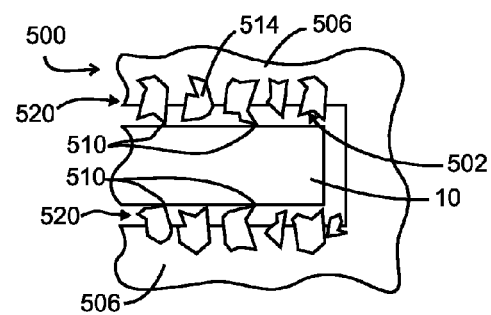
FIG. 8 is a sectional view with portions broken away of one embodiment of the invention.
Figure 9:
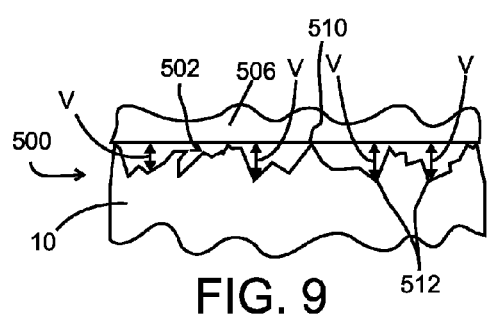
FIG. 9 is an enlarged sectional view with portions broken away of one embodiment of the invention.
Figure 10:
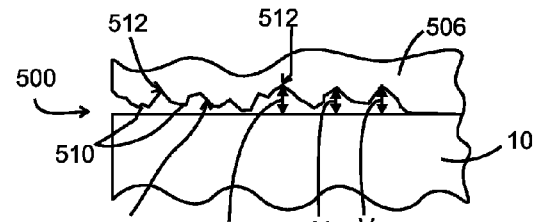
FIG. 10 is an enlarged sectional view with portions broken away of one embodiment of the invention.
Figure 11:
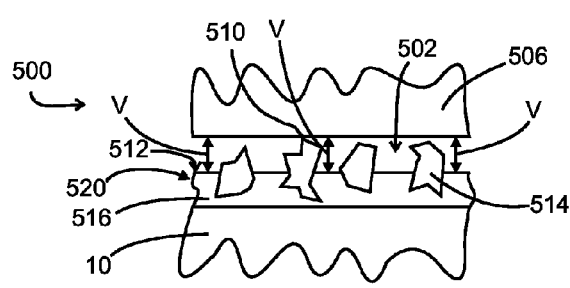
FIG. 11 is an enlarged sectional view with portions broken away of one embodiment of the invention.
Figure 12:
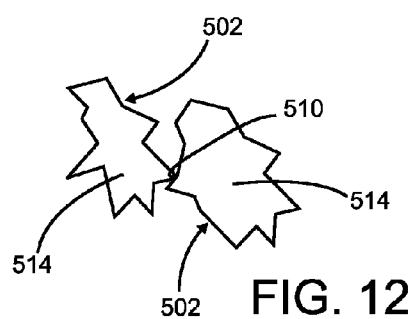
FIG. 12 illustrates one embodiment of the invention.

In another embodiment of the invention the damping means or frictional surface 502 may be provided by particles 514 or fibers provided on at least one face of the insert 10 or a surface of the body 506 of the part 500. The particles 514 may have an irregular shape (e.g., not smooth) to enhance frictional damping, as illustrated in FIG. 12. One embodiment of the invention may include a layer 520 including the particles 514 or fibers which may be bonded to each other or to a surface of the body 506 of the part or a surface of the insert 10 due to the inherent bonding properties of the particles 514 or fibers. For example, the bonding properties of the particles 514 or fibers may be such that the particles 514 or fibers may bind to each other or to the surfaces of the body 506 or the insert 10 under compression. In another embodiment of the invention, the particles 514 or the fibers may be treated to provide a coating thereon or to provide functional groups attached thereto to bind the particles together or attach the particles to at least one of a surface of the body 506 or a surface of the insert 10. In another embodiment of the invention, the particles 514 or fibers may be embedded in at least one of the body 506 of the part or the insert 10 to provide the frictional surface 502 (FIGS. 7-8).

In embodiments wherein at least a potion of the part 500 is manufactured such that the insert 10 and/or the particles 514 or fibers are exposed to the temperature of a molten material such as in casting, the insert 10 and/or particles 514 or fibers may be made from materials capable of resisting flow or resisting significant erosion during the manufacturing. For example, the insert 10 and/or the particles 514 or fibers may include refractory materials capable of resisting flow or that do not significantly erode at temperatures above 1100° F., above 2400° F., or above 2700° F. When molten material, such as metal, is cast around the insert 10 and/or the particles 514, the insert 10 or the particles 514 should not be wet by the molten material so that the molten material does not bond to the insert 10 or layer 520 at locations wherein a frictional surface 502 for providing frictional damping is desired.

Illustrative examples of suitable particles 514 or fibers include, but are not limited to, particles or fibers including silica, alumina, graphite with clay, silicon carbide, silicon nitride, cordierite (magnesium-iron-aluminum silicate), mullite (aluminum silicate), zirconia (zirconium oxide), phyllosilicates, or other high-temperature-resistant particles. In one embodiment of the invention the particles 514 may have a length along the longest dimension thereof ranging from about 1 µm-350 µm, or 10 µm-250 µm.

In another embodiment of the invention, the layer 520 may be a coating over the body 506 of the part or the insert 10. The coating may include a plurality of particles 514 which may be bonded to each other and/or to the surface of the body 506 of the part or the insert 10 by an inorganic or organic binder 516 (FIGS. 6, 11) or other bonding materials. Illustrative examples of suitable binders include, but are not limited to, epoxy resins, phosphoric acid binding agents, calcium aluminates, sodium silicates, wood flour, or clays. In another embodiment of the invention the particles 514 may be held together and/or adhered to the body 506 or the insert 10 by an inorganic binder. In one embodiment, the coating may be deposited on the insert 10 or body 506 as a liquid dispersed mixture of alumina-silicate-based, organically bonded refractory mix.

In another embodiment, the coating may include at least one of alumina or silica particles, mixed with a lignosulfonate binder, cristobalite ($SiO_2$), quartz, or calcium lignosulfonate.

The calcium lignosulfonate may serve as a binder. In one embodiment, the coating may include IRONKOTE. In one embodiment, a liquid coating may be deposited on a portion of the insert and may include any high temperature ceramic coating, such as but not limited to, LADLE KOTE 310B. In another embodiment, the coating may include at least one of clay, $Al_2O_3$, $SiO_2$, a graphite and clay mixture, silicon carbide, silicon nitride, cordierite (magnesium-iron-aluminum silicate), mullite (aluminum silicate), zirconia (zirconium oxide), or phyllosilicates. In one embodiment, the coating may comprise a fiber such as ceramic or mineral fibers.

When the layer 520 including particles 514 or fibers is provided over the insert 10 or the body 506 of the part the thickness L (FIG. 6) of the layer 520, particles 514 and/or fibers may vary. In various embodiments, the thickness L of the layer 520, particles 514 and/or fibers may range from about 1 μm-400 μm, 10 μm-400 μm, 30 μm-300 μm, 30 μm-40 μm, 40 μm-100 μm, 100 μm-120 μm, 120 μm-200 μm, 200 μm-300 μm, 200 μm-250 μm, or variations of these ranges.

In yet another embodiment of the invention the particles 514 or fibers may be temporarily held together and/or to the surface of the insert 10 by a fully or partially sacrificial coating. The sacrificial coating may be consumed by molten metal or burnt off when metal is cast around or over the insert 10. The particles 514 or fibers are left behind trapped between the body 506 of the cast part and the insert 10 to provide a layer 520 consisting of the particles 514 or fibers or consisting essentially of the particles 514 or fibers.

Figure 6:
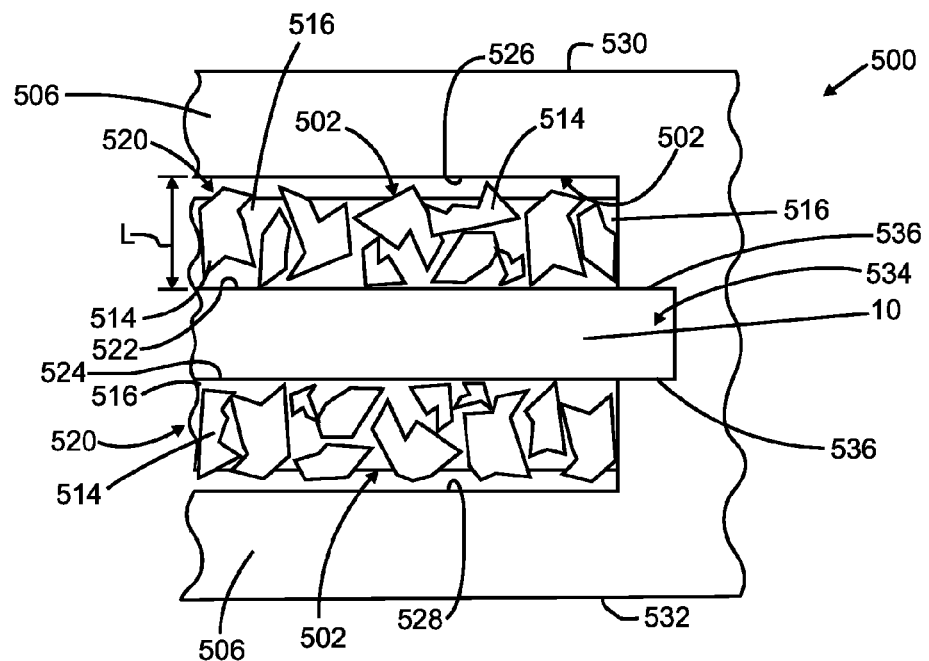
FIG. 6 is a sectional view with portions broken away of one embodiment of the invention including an insert having a layer thereon to provide a frictional surface or damping.

The layer 520 may be provided over the entire insert 10 or only over a portion thereof. In one embodiment of the invention the insert 10 may include a tab 534 (FIG. 6). For example, the insert 10 may include an annular body portion and a tab 534 extending radially inward or outward therefrom. In one embodiment of the invention at least one wettable surface 536 of the tab 534 does not include a layer 520 including particles 514 or fibers, or a wettable material such as graphite is provided over the tab 534, so that the cast metal is bonded to the wettable surface 536 to attach the insert 10 to the body 506 of the part 500 but still allow for frictional damping over the remaining insert surface which is not bonded to the casting.

In one embodiment of the invention at least a portion of the insert 10 is treated or the properties of the insert 10 are such that molten metal will not wet or bond to that portion of the insert 10 upon solidification of the molten metal. According to one embodiment of the invention at least one of the body 506 of the part or the insert 10 includes a metal, for example, but not limited to, aluminum, titanium, steel, stainless steel, cast iron, any of a variety of other alloys, or metal matrix composite including abrasive particles. In one embodiment of the invention the insert 10 may include a material such as a metal having a higher melting point than the melting point of the molten material being cast around a portion thereof.

In one embodiment the insert 10 may have a minimum average thickness of 0.2 mm and/or a minimum width of 0.1 mm and/or a minimum length of 0.1 mm. In another embodiment the insert 10 may have a minimum average thickness of 0.2 mm and/or a minimum width of 2 mm and/or a minimum length of 5 mm. In other embodiments the insert 10 may have a thickness ranging from about 0.1-20 mm, 0.1-6.0 mm, or 1.0-2.5 mm, or ranges therebetween.

Referring now to FIGS. 9-10, again the frictional surface 502 may have a plurality of peaks 510 and a plurality of valleys 512. The depth as indicated by line V of the valleys 512 may vary with embodiments. In various embodiments, the average of the depth V of the valleys 512 may range from about 1 μm-300 μm, 50 μm-260 μm, 100 μm-160 μm or variations of these ranges. However, for all cases there is local contact between the body 506 and the insert 10 during component operation for frictional damping to occur.

In other embodiments of the invention improvements in the frictional damping may be achieved by adjusting the thickness (L, as shown in FIG. 6) of the layer 520, or by adjusting the relative position of opposed frictional surfaces 502 or the average depth of the valleys 512.

In one embodiment the insert 10 is not pre-loaded or under pre-tension or held in place by tension. In one embodiment the insert 10 is not a spring. Another embodiment of the invention includes a process of casting a material comprising a metal around an insert 10 with the proviso that the frictional surface 502 portion of the insert used to provide frictional damping is not captured and enclosed by a sand core that is placed in the casting mold. In various embodiments the insert 10 or the layer 520 includes at least one frictional surface 502 or two opposite friction surfaces 502 that are completely enclosed by the body 506 of the part. In another embodiment the layer 520 including the particles 514 or fibers that may be completely enclosed by the body 506 of the part or completely enclosed by the body 506 and the insert 10, and wherein at least one of the body 506 or the insert 10 comprises a metal or consists essentially of a metal. In one embodiment of the invention the layer 520 and/or insert 10 does not include or is not carbon paper or cloth.

Referring again to FIGS. 5-6, in various embodiments of the invention the insert 10 may include a first face 522 and an opposite second face 524 and the body 506 of the part may include a first inner face 526 adjacent the first face 522 of the insert 10 constructed to be complementary thereto, for example nominally parallel thereto. The body 506 of the part includes a second inner face 528 adjacent to the second face 524 of the insert 10 constructed to be complementary thereto, for example parallel thereto. The body 506 may include a first outer face 530 overlying the first face 522 of the insert 10 constructed to be complementary thereto, for example parallel thereto. The body 506 may include a first outer face 532 overlying the second face 524 of the insert 10 constructed to be complementary thereto, for example parallel thereto. However, in other embodiments of the invention the outer faces 530, 532 of the body 506 are not complementary to associated faces 522, 524 of the insert 10. When the damping means is provided by a narrow slot-like feature 508 formed in the body 506 of the part 500, the slot-like feature 508 may be defined in part by a first inner face 526 and a second inner face 528 which may be constructed to be complementary to each other, for example parallel to each other. In other embodiments the surfaces 526 and 528; 526 and 522; or 528 and 524 are mating surfaces but not parallel to each other.

Figure 13:
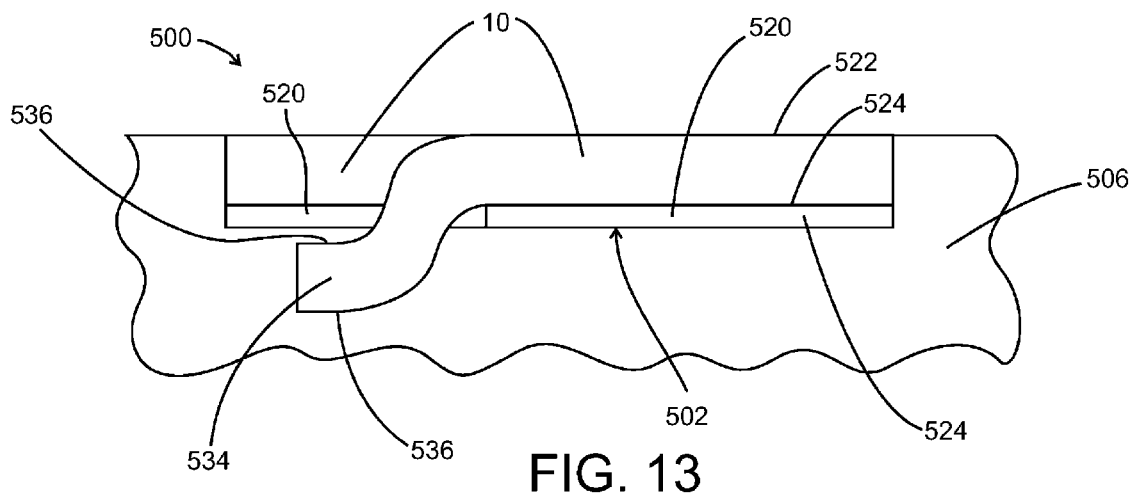
FIG. 13 is a sectional view with portions broken away of one embodiment of the invention.
Figure 14:
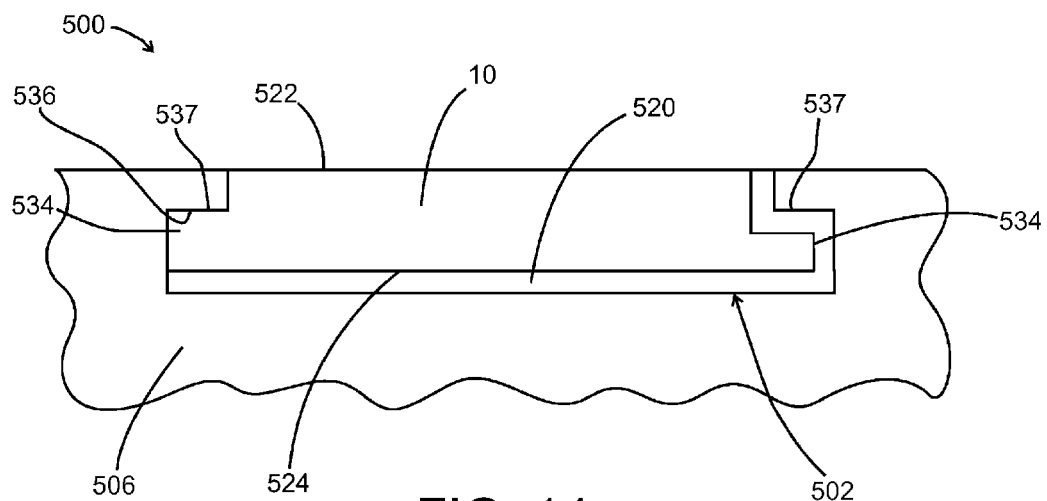
FIG. 14 is a sectional view with portions broken away of one embodiment of the invention.

Referring to FIGS. 13-14, in one embodiment of the invention the insert 10 may be an inlay wherein a first face 522 thereof is not enclosed by the body 506 of the part. The insert 10 may include a tang or tab 534 which may be bent downward as shown in FIG. 13. In one embodiment of the invention a wettable surface 536 may be provided that does not include a layer 520 including particles 514 or fibers, or a wettable material such as graphite is provided over the tab 534, so that the cast metal is bonded to the wettable surface 536 to attach the insert 10 to the body of the part but still allow for frictional damping on the non-bonded surfaces. A layer 520 including particles 514 or fibers may underlie the portion of the second face 524 of the insert 10 not used to make the bent tab 534.

In another embodiment the insert 10 includes a tab 534 which may be formed by machining a portion of the first face 522 of the insert 10 (FIG. 14). The tab 534 may include a wettable surface 536 having cast metal bonded thereto to attach the insert 10 to the body of the part but still allow for friction damping by way of the non-bonded surfaces. A layer 520 including particles 514 or fibers may underlie the entire second face 524 or a portion thereof. In other embodiments of the invention all surfaces including the tabs 534 may be non-wettable, for example by way of a coating 520 thereon, and features of the body portion 506 such as, but not limited to, a shoulder 537 may be used to hold the insert 10 in place.

Figure 15:
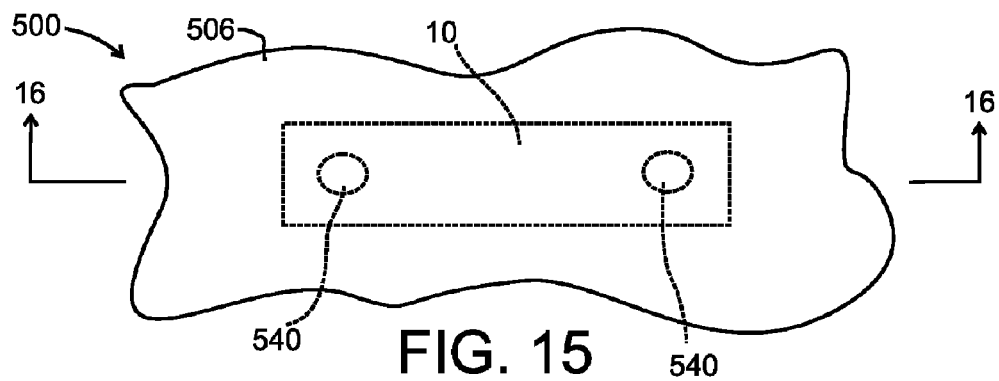
FIG. 15 is a plan view with portions broken away illustrating one embodiment of the invention.

Referring now to FIG. 15, one embodiment of the invention may include a part 500 having a body portion 506 and an insert 10 enclosed by the body part 506. The insert 10 may include through holes formed therein so that a stake or post 540 extends into or through the insert 10.

Figure 16:
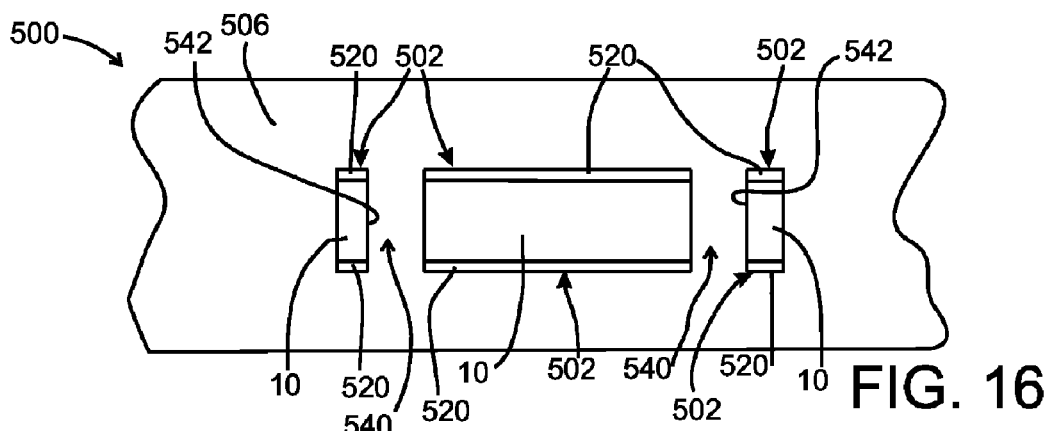
FIG. 16 is a sectional view taken along line 16-16 of FIG. 15 illustrating one embodiment of the invention.

Referring to FIG. 16, which is a sectional view of FIG. 15 taken along line 16-16, in one embodiment of the invention a layer 520 including a plurality of particles 514 or fibers (not shown) may be provided over at least a portion of the insert 10 to provide a frictional surface 502 and to prevent bonding thereto by cast metal. The insert 10 including the layer 520 may be placed in a casting mold and molten metal may be poured into the casting mold and solidified to form the post 540 extending through the insert 10. An inner surface 542 defining the through hole of the insert 10 may be free of the layer 520 or may include a wettable material thereon so that the post 540 is bonded to the insert 10. Alternatively, in another embodiment the post 540 may not be bonded the insert 10 at the inner surface 542. The insert 10 may include a feature such as, but not limited to, a shoulder 505 and/or the post 540 may include a feature such as, but not limited to, a shoulder 537 to hold the insert in place.

Figure 17:
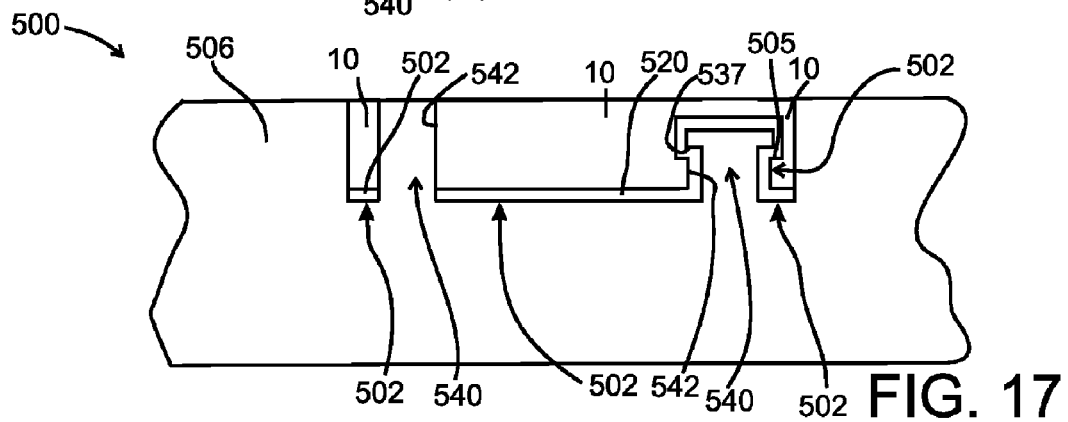
FIG. 17 is a sectional view with portions broken away illustrating one embodiment of the invention.

Referring now to FIG. 17, in another embodiment, the insert may be provided as an inlay in a casting including a body portion 506 and may include a post 540 extending into or through the insert 10. The insert 10 may be bonded to the post 540 to hold the insert in place and still allow for frictional damping. In one embodiment of the invention the insert 10 may include a recess defined by an inner surface 542 of the insert 10 and a post 540 may extend into the insert 10 but not extend through the insert 10. In one embodiment the post 540 may not be bonded to the insert 10 at the inner surface 542. The insert 10 may include a feature such as, but not limited to, a shoulder 505 and/or the post 540 may include a feature such as, but not limited to, a shoulder 537 to hold the insert in place.

Figure 18:
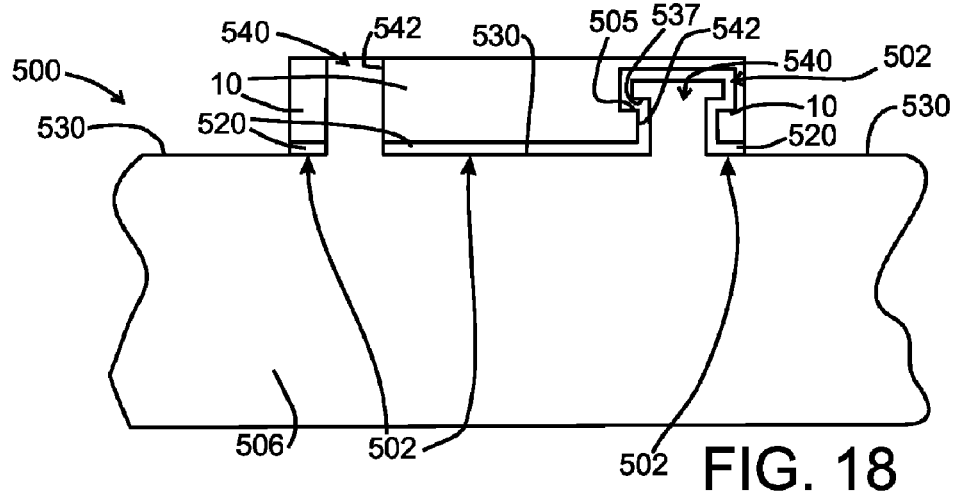
FIG. 18 is a sectional view with portions broken away illustrating another embodiment of the invention.

Referring now to FIG. 18, in another embodiment of the invention, an insert 10 or substrate may be provided over an outer surface 530 of the body portion 506. A layer 520 may or may not be provided between the insert 10 and the outer surface 530. The insert 10 may be constructed and arranged with through holes formed therethrough or a recess therein so that cast metal may extend into or through the insert 10 to form a post 540 to hold the insert in position and still allow for frictional damping. The post 540 may or may not be bonded to the insert 10 as desired. The post 540 may extend through the insert 10 and join another portion of the body 506 if desired.

When the term "over," "overlying," overlies," "under," "underlying," or "underlies" is used herein to describe the relative position of a first layer or component with respect to a second layer or component such shall mean the first layer or component is directly on and in direct contact with the second layer or component or that additional layers or components may be interposed between the first layer or component and the second layer or component.

The above description of embodiments of the invention is merely exemplary in nature and, thus, variations thereof are not to be regarded as a departure from the spirit and scope of the invention.

What is claimed is:

1. A method of manufacturing a damped part comprising:
providing an insert comprising a body comprising an inner edge and an outer edge; a plurality of tabs extending from at least one of the inner edge or outer edge of the body; a plurality of slots through the body between the inner edge and the outer edge; and a plurality of connector regions in the body comprising a first connector region between each slot and the outer edge of the body and a second connector region between each slot and the inner edge of the body;
positioning the insert in a mold such that the plurality of tabs hold the insert in a desired position in the mold; and
casting a material comprising a metal around the insert to form a part so that the insert becomes segmented and so that the insert provides a frictional surface for friction damping of the part.

2. A method of manufacturing a damped part as set forth in claim 1 wherein the body is annular.

3. A method of manufacturing a damped part as set forth in claim 1 further comprising providing a coating over at least a portion of the body of the insert.

4. A method of manufacturing a damped part as set forth in claim 3 wherein the coating comprises at least one of silica, alumina, graphite with clay, silicon carbide, silicon nitride, cordierite (magnesium-iron-aluminum silicate), mullite (aluminum silicate), zirconia (zirconium oxide), phyllosilicates, other high-temperature-resistant particles, clay, $Al_2O_3$, $SiO_2$, a lignosulfonate binder, a calcium lignosulfonate binder, cristobalite ($SiO_2$), a fiber, a ceramic fiber, a mineral fiber, quartz, an epoxy resin, a phosphoric acid binding agent, calcium aluminates, sodium silicates, wood flour, non-refractory polymeric materials, ceramics, composites, wood, or a liquid dispersed mixture of alumina-silicate-based, organically bonded refractory mix.

5. A method of manufacturing a damped part as set forth in claim 1 wherein the insert comprises steel.

6. A method of manufacturing a damped part as set forth in claim 1 wherein the material comprises cast iron.

7. A method of manufacturing a damped part as set forth in claim 1 further comprising providing a layer comprising particles or fibers over at least a portion of the insert.

8. A method of manufacturing a damped part as set forth in claim 1 further comprising treating at least a portion of the insert so that the material comprising a metal does not wet the portion of the insert and bond thereto upon solidification.

* * * * *